United States Patent
Itaka

(10) Patent No.: US 7,373,616 B2
(45) Date of Patent: May 13, 2008

(54) DESIGNING APPARATUS, AND INSPECTION APPARATUS FOR DESIGNING AN INTEGRATED CIRCUIT HAVING REDUCED LEAKAGE CURRENT

(75) Inventor: Yasuhito Itaka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 391 days.

(21) Appl. No.: 11/057,205

(22) Filed: Feb. 15, 2005

(65) Prior Publication Data
US 2005/0198594 A1  Sep. 8, 2005

(30) Foreign Application Priority Data
Feb. 16, 2004  (JP)  ............................ 2004-038432

(51) Int. Cl.
*G06F 17/50* (2006.01)
(52) U.S. Cl. ....................... 716/2; 716/1; 716/5; 716/6; 716/18
(58) Field of Classification Search ................ 716/1–6, 716/18
See application file for complete search history.

(56) References Cited

U.S. PATENT DOCUMENTS 6,380,764 B1   4/2002  Katoh et al.
6,493,856 B2 * 12/2002 Usami et al. ................. 716/10
6,859,917 B2 *  2/2005 Shimazaki et al. ........... 716/17
7,005,906 B2 *  2/2006 Miyamoto et al. .......... 327/293
7,216,329 B2 *  5/2007 Kitahara et al. .............. 716/17

FOREIGN PATENT DOCUMENTS

| JP | 2002-9242   | 1/2002  |
| JP | 2002-334930 | 11/2002 |
| JP | 2003-31676  | 1/2003  |

* cited by examiner

*Primary Examiner*—Jack Chiang
*Assistant Examiner*—Nghia M Doan
(74) *Attorney, Agent, or Firm*—Oblon, Spivak, McClelland, Maier & Neustadt, P.C.

(57) ABSTRACT

A method of designing a semiconductor integrated circuit, comprises: replacing a circuit element disposed in the semiconductor integrated circuit with a transistor having a high threshold value or a circuit element having a small juxtaposition number in order to prevent deviation of a signal voltage flowing through the semiconductor integrated circuit from a power voltage and a ground voltage; replacing a circuit element disposed in a subsequent stage of the replaced circuit element in order to prevent the deviation of the signal voltage from the power voltage and the ground voltage from being propagated to a subsequent stage with a transistor having a high threshold value or a circuit element having a small juxtaposition number; and then arranging circuit elements constituting the semiconductor integrated circuit in such a manner that the semiconductor integrated circuit stably operates.

17 Claims, 7 Drawing Sheets

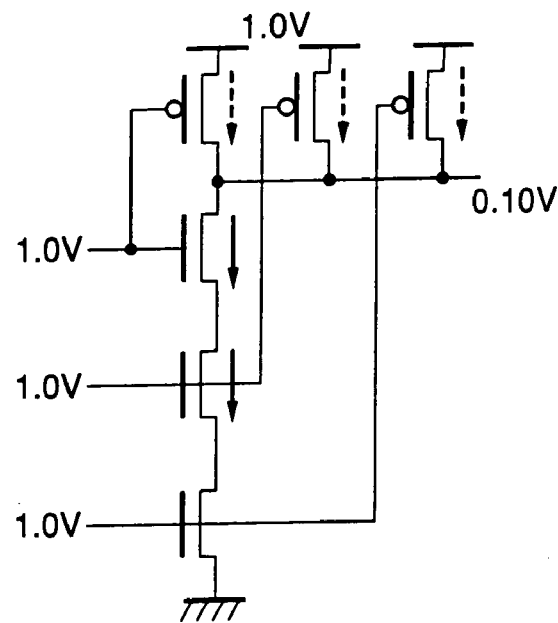
FIG. 14
(Background Art)
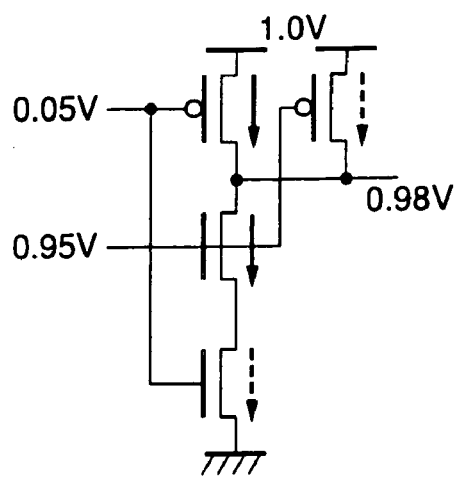 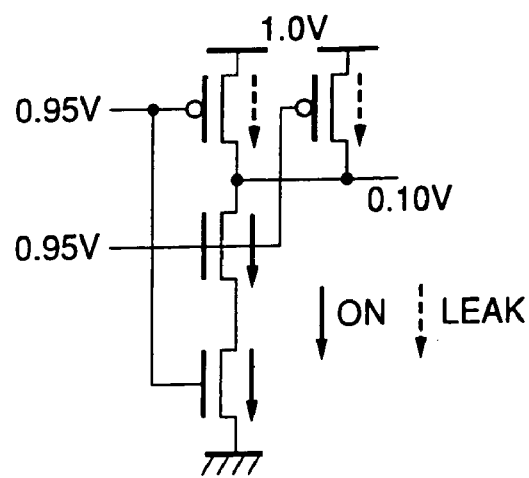
FIG. 15A                FIG. 15B
(Background Art)        (Background Art)

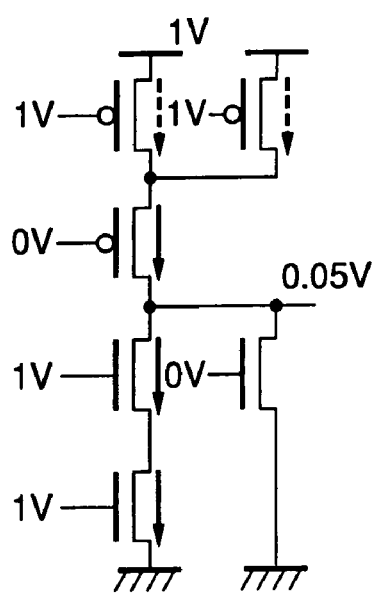 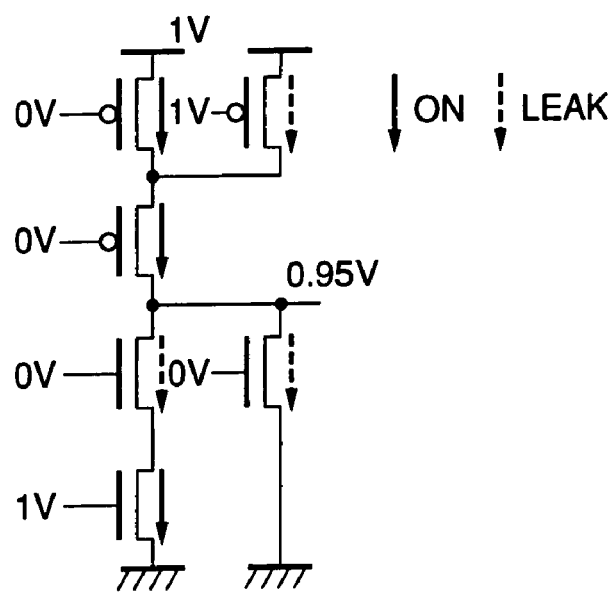
FIG. 19A
(Background Art)
FIG. 19B
(Background Art)

DESIGNING APPARATUS, AND INSPECTION APPARATUS FOR DESIGNING AN INTEGRATED CIRCUIT HAVING REDUCED LEAKAGE CURRENT

CROSS REFERENCE TO RELATED APPLICATIONS

This application claims benefit of priority under 35 USC § 119 to Japanese Patent Application No. 2004-038432 filed on Feb. 16, 2004, the entire contents of which are incorporated by reference.

BACKGROUND OF THE INVENTION

The present invention relates to a method of designing a semiconductor integrated circuit, a designing apparatus, and an inspection apparatus, particularly to a method of designing a semiconductor integrated circuit and a designing apparatus for designing a high-speed operation circuit in which stability of the whole semiconductor integrated circuit is secured and an increase of a leak current is suppressed, and an inspection apparatus for a semiconductor integrated circuit, which reduces a leak current to thereby stably operate.

In recent years, with speeding-up/reduction of threshold values of the semiconductor integrated circuit, power consumption of the circuit has increased more than ever. The power consumption also includes the leak current, and as a method of reducing the leak current, a designing method is well known in which the circuit is designed in such a manner as to arrange transistors having high and low threshold values in a mixed manner. In this designing method, a high-speed transistor having a small threshold value (i.e., the leak current is large) is used in a portion in which high speed is required, and a low-speed transistor having a large threshold value (i.e., the leak current is small) is used in another portion. Accordingly, while the leak current of the whole circuit is kept to be small, the speed is raised.

However, when this replacement is performed, the following problem occurs. As shown in 13(a), when 1 is input into both inputs of a circuit (NAND circuit in this drawing) including PMOSs arranged in parallel, output indicates a value floating a little from a value of 0 (the value does not completely agree with a predetermined value, and has a difference from the predetermined value) because of the leak current on a PMOS side. For example, the output is 0.05 V with respect to a power voltage of 1 V.

Furthermore, as shown in FIG. 14, in a circuit in which the number of transistors arranged in parallel increases, and three inputs are arranged in parallel (3-input NAND circuit in this example), a voltage further distant from a ground voltage is output. This phenomenon remarkably appears in a transistor having a small threshold value as shown in FIGS. 13(a) (b). When the transistor having a large threshold value is used as shown in FIGS. 12(a) (b), the leak current of the transistor itself is small, and therefore a problem is small.

Moreover, when a floating output (e.g., 0.95 V) is received by a PMOS juxtaposed circuit (e.g., the NAND circuit) as shown in FIGS. 15(a) (b), the output further floats. Therefore, for example, in the example shown in FIG. 15(b), 0.10 V is output, and the leak current of the transistor which receives the output voltage indicates a large value. When an input voltage floats from a power voltage or ground voltage as shown in FIGS. 15(b) and 16(b), a potential difference is generated between gate and source of the transistor which receives the input, and the leak current exponentially increases because of properties of the transistor (see FIG. 17). Therefore, problems occur that the leak current of the whole circuit increases, or a circuit operation becomes unstable. This phenomenon does not raise a very large problem with respect to an output on a 1-side of a juxtaposed portion in a PMOS circuit, or an output on a 0-side of a juxtaposed portion in a NMOS circuit as shown in FIGS. 15(a) and 16(a). This is because the voltage floats a little.

It is to be noted that a circuit shown in FIGS. 18(a) (b) is a constitution example in which AND-NOR circuits are continuously arranged. FIG. 18(a) is a transistor connection diagram, and FIG. 18(b) is a logical circuit diagram. In a logical circuit constitution, an AND circuit for calculating a logical product of inputs B and C, and a NOR circuit for calculating exclusive OR of two inputs including the output of the AND circuit as input A are continuously arranged as shown in FIG. 18(b). In the transistor circuit shown in FIG. 18(a), a logical operation in a case where inputs A, B, C are changed at 0 V and 1 V is shown in FIGS. 19(a) (b).

FIG. 19(a) shows a case where the input A is 0 V, and inputs B, C are 1 V, and a leak current is generated in a juxtaposed PMOS transistor disposed in an upper stage. FIG. 19(b) shows a case where inputs A, B are 0 V, and input C is 1 V, and a leak current is generated in a juxtaposed NMOS transistor disposed in a lower stage. A deviation between an operation voltage and a power voltage of a portion in which leak occurs is caused. When the high-speed transistor having a small threshold value is applied to this portion, a problem occurs.

It is to be noted that as prior techniques of the present application, there are U.S. Pat. No. 6,380,761B1, Japanese Patent Application Laid-open No. 2002-9242 and the like.

As described above, in the conventional semiconductor integrated circuit design, the transistor constituting the logical circuit in order to speed up the circuit operation is uniformly replaced with the high-speed transistor having the small threshold value. Then, the leak current increases in a case where the logical circuits having juxtaposed inputs are continuously arranged. There are problems that the deviation between the operation voltage and the power voltage or the ground voltage increases, and the operation of the logical circuit becomes unstable because of the deviation generated between the operation voltage and the power voltage.

Therefore, in order to prevent a signal from being separated from the power voltage and the ground voltage, there has been a demand for a semiconductor integrated circuit capable of preventing the signal from being separated from the power voltage and the ground voltage, or preventing the separation from being propagated to a subsequent stage, or further capable of securing circuit operation stability, and preventing increase of the leak current of the transistor by replacement with a transistor having a large threshold value or replacement/insertion with a circuit having a small number of juxtaposed transistors.

SUMMARY OF THE INVENTION

According to a first basic constitution, a method of designing a semiconductor integrated circuit, comprises: replacing a circuit element disposed in the semiconductor integrated circuit with a transistor having a high threshold value or a circuit element having a small juxtaposition number in order to prevent deviation of a signal voltage flowing through the semiconductor integrated circuit from a power voltage and a ground voltage; replacing a circuit element disposed in a subsequent stage of the replaced circuit element with a transistor having a high threshold value or a circuit element having a small juxtaposition number in order to prevent the deviation of the signal voltage from the power voltage and the ground voltage from being propagated to the subsequent stage; and then arranging circuit elements constituting the semiconductor integrated circuit in such a manner that the semiconductor integrated circuit stably operates.

Moreover, according to a second basic constitution, a method of designing a semiconductor integrated circuit which performs a predetermined logical operation, comprises: synthesizing the semiconductor integrated circuit by a predetermined circuit arrangement in which a plurality of logical circuits each performing the predetermined logical operation are continuously connected; replacing the predetermined circuit arrangement in such a manner that a low-threshold-value high-speed transistor is applied to a portion required to be speeded up, and a high-threshold-value low-speed transistor is applied to a portion which is not required to be speeded up in the predetermined circuit arrangement; continuously connecting the low-threshold-value high-speed transistors to thereby detect such an inadequacy of connection that a potential of a signal flowing through the circuit gradually deviates from the power voltage and the ground voltage; and replacing the low-threshold-value high-speed transistor disposed in a portion in which the inadequacy of the connection is detected with a constitution having less leak current.

Furthermore, according to a third basic constitution, an apparatus for designing a semiconductor integrated circuit which performs a predetermined logical operation, comprises: synthesis means for synthesizing the semiconductor integrated circuit by a predetermined circuit arrangement in which a plurality of logical circuits each performing the predetermined logical operation are continuously connected; first replacement means for replacing the predetermined circuit arrangement in such a manner that a low-threshold-value high-speed transistor is applied to a portion required to be speeded up and a high-threshold-value low-speed transistor is applied to a portion which is not required to be speeded up in the predetermined circuit arrangement; inadequacy detection means for detecting such an inadequacy of connection that a potential of a signal flowing through the circuit gradually deviates from a power voltage and a ground voltage, when the low-threshold-value high-speed transistors are continuously connected; and second replacement means for replacing the low-threshold-value high-speed transistor disposed in a portion in which the inadequacy of the connection is detected with a constitution having less leak current.

BRIEF DESCRIPTION OF THE DRAWINGS

FIG. 14 is a circuit diagram showing a relation between the input and output voltages in a three-input NAND circuit;

FIG. 15(a) is a circuit diagram showing an output voltage in a case where input voltages are 0.05 V and 0.95 V in a NAND circuit, and FIG. 15(b) is a circuit diagram showing an output voltage in a case where both input voltages are 0.95 V;

FIG. 19(a) is a transistor connection diagram showing a leak state of PMOS juxtaposition in a case where an input voltage is changed, and FIG. 19(b) is a diagram showing a leak state of NMOS juxtaposition.

DESCRIPTION OF THE PREFERRED EMBODIMENTS

Embodiments of a method of designing a semiconductor integrated circuit, a designing apparatus, and an inspection apparatus will be described hereinafter in detail with reference to the accompanying drawings.

First Embodiment

Figure 1:
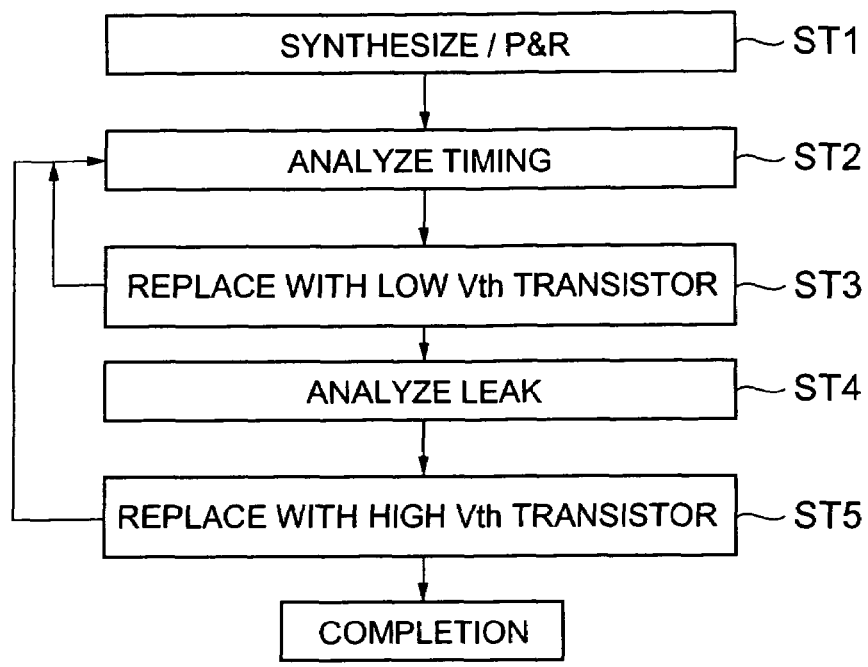
FIG. 1 is a flowchart showing a basic constitution of a semiconductor integrated circuit designing method according to a first embodiment.

Basically in a method of designing a semiconductor integrated circuit according to a first embodiment, as shown in FIG. 1, after analyzing timings of a semiconductor integrated circuit, and replacing the circuit with a low threshold value transistor circuit, leak currents are analyzed.

In the method of designing the semiconductor integrated circuit according to the first embodiment, transistors whose threshold values are high and low are arranged in a mixed manner to thereby design the semiconductor integrated circuit performing a predetermined logical operation. The designing method concretely comprises the following steps. First, in a first step ST1, the semiconductor integrated circuit is synthesized and subjected to placement and routing (P&R) by a predetermined circuit arrangement in which a plurality of logical circuits each performing the predetermined logical operation are continuously connected to one another.

Next, after synthesizing the semiconductor integrated circuit and performing the P&R in the step ST1, an operation timing of the semiconductor integrated circuit synthesized and subjected to the P&R is analyzed in step ST2. After analyzing the operation timing, a predetermined circuit arrangement is replaced in step ST3 in such a manner that a high-threshold-value low-speed transistor is replaced with a low-threshold-value high-speed transistor. After performing the replacement with the low-threshold-value high-speed transistor, a leak current in the replaced circuit arrangement is analyzed in step ST4.

When the leak current is detected in the step ST4, it is detected that there are inadequacies in the arrangement or the connection of the low-threshold-value high-speed transistors. Next, in step ST5, the low-threshold-value high-speed transistor is replaced with a constitution having less leak current. As a concrete example of the constitution having less leak current, a circuit portion or arrangement in which an inadequacy has been detected is replaced again with the high-threshold-value low-speed transistor, or a buffer circuit is inserted into a subsequent stage of a logical circuit having an inadequacy in connection, and the design of the semiconductor integrated circuit attributable to the arrangement of the low-threshold-value high-speed transistor is reviewed. After performing the replacement again, or replacing the constitution by insertion, an operation timing of a new circuit is analyzed again, and an operation including the timing analysis to the re-replacement is repeated required times so that an optimum circuit arrangement can be determined.

In the above-described constitution, as a most basic constitution of the present application, the predetermined circuit arrangement is replaced in such a manner as to apply the low-threshold-value high-speed transistor to a portion required to be speeded up, and apply the high-threshold-value low-speed transistor to a portion which is not required to be speeded up. Moreover, such an inadequacy of connection is detected that a potential of a signal flowing through the circuit gradually deviates from a power voltage and a ground voltage, when the low-threshold-value high-speed transistors are continuously connected. The low-threshold-value high-speed transistor disposed in the portion in which the inadequacy of the connection has been detected is replaced with the high-threshold-value low-speed transistor again. To detect the inadequacy of the connection, analysis of timing and analysis of leak current are used.

Figure 2:
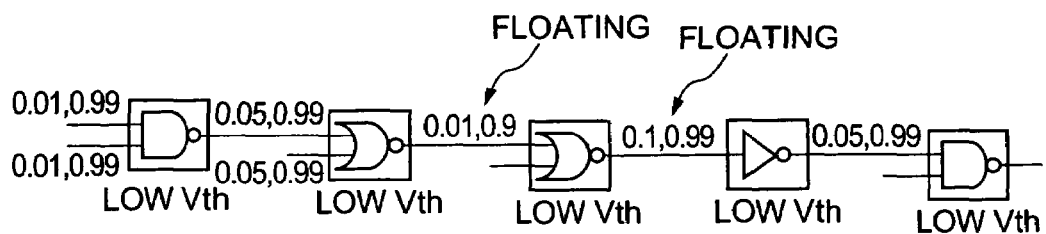
FIG. 2 is a logical circuit block diagram showing analysis of a leak current in the first embodiment.

A concrete example of the method of designing the semiconductor integrated circuit according to the first embodiment will be described using a logical circuit shown in FIGS. 2 and 3. As shown in FIG. 2, an output voltage is calculated from an input voltage of each node to thereby calculate a voltage value in each node. The operation voltage of each node must be originally a power voltage or a ground voltage. However, when the leak current is large in a considerable degree, the voltage deviates a little from the power voltage or the ground voltage.

The voltage value of the operation voltage deviates from that of the power voltage or the ground voltage. It is to be noted that the leak current is analyzed on conditions that the leak current is largest (conditions of process fluctuations toward a high-voltage, high-temperature, low-threshold-value side). To prevent a floating potential, if any, from being propagated to the next node as shown in FIG. 2, the transistor is replaced with a high threshold value transistor as shown in FIG. 3. Accordingly, generation of the leak current is prevented in such a manner that the output voltage is in the vicinity of the power voltage or the ground voltage.

In the circuit shown in FIG. 2, a NAND circuit, NOR circuit, inverter circuit and the like are continuously connected to one another, and a predetermined logical operation is executed. When NAND or NOR circuits including multiple inputs and juxtaposed/connected transistors are continuously connected, an operation voltage of a floating circuit portion shown in the drawing causes deviation of the voltage value from the power voltage or the ground voltage. Since the output voltage floats by a second-stage logical circuit in FIG. 2, the floating is shown in outputs of second and third-stage logical circuits. However, since the inadequacy of the connection lies in the second-stage NOR circuit, the low-threshold-value high-speed transistor of the corresponding circuit portion is replaced with the high-threshold-value low-speed transistor, and then a circuit is obtained as shown in FIG. 3. In the circuit shown in FIG. 3, since the second-stage NOR circuit is replaced, no floating occurs in the output of the second stage.

Second Embodiment

Figure 3:
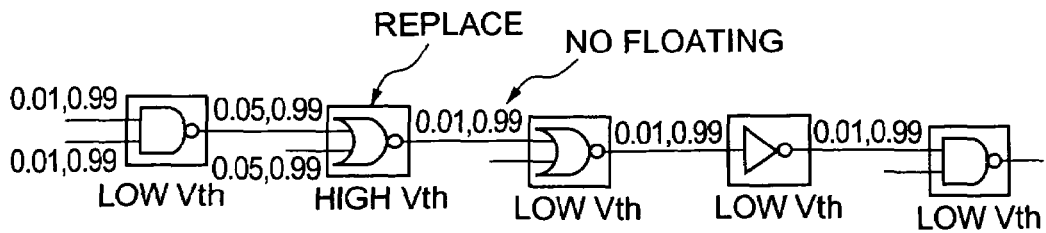
FIG. 3 is a logical circuit block diagram showing a replacing/returning state from a low threshold value transistor after the analysis of the leak current to a high threshold value transistor in the first embodiment.
Figure 4:
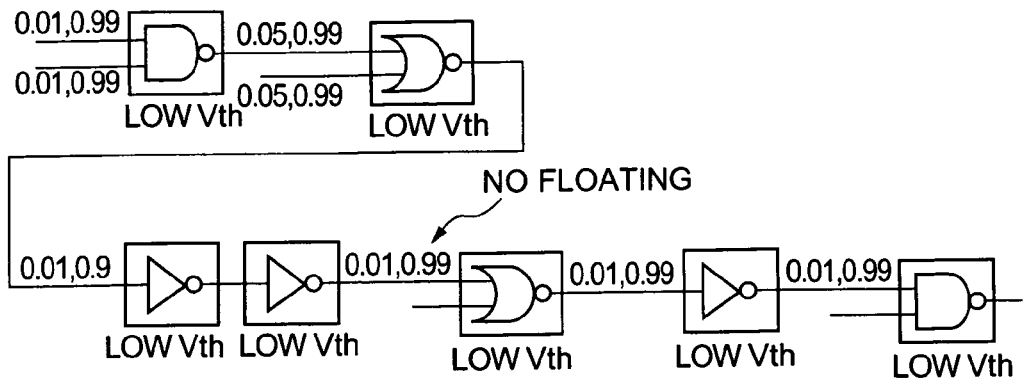
FIG. 4 is a logical circuit block diagram showing replacement after the leak current analysis, by insertion of an inverter circuit in the designing method according to a second embodiment.

In a constitution of FIG. 3, a constitution of a logical circuit in which floating occurs in an output is changed to a high-threshold-value low-speed transistor from a low-threshold-value high-speed transistor, and an output voltage has been improved. On the other hand, in a second embodiment shown in FIG. 4, two low threshold value inverter circuits are connected and inserted between an output of a second-stage NOR circuit, in which floating occurs first in FIG. 2, and an input of a third-stage NOR circuit. Even by the constitution of FIG. 4, operation potentials of subsequent-stage inverter circuits are 0.01, 0.9, leak current is prevented, and a predetermined logical operation can be stably performed.

In the semiconductor integrated circuit according to the second embodiment, a circuit (inverter, etc.) which is not connected in parallel is inserted in a path in which an output voltage is expected to deviate from a power voltage and a ground voltage, such as a subsequent stage of a multiple-input circuit or a low threshold value circuit. Consequently, an effect similar to that of a constitution in which output and input side transistors are replaced with high threshold value circuits as in the first embodiment can be obtained, and a circuit which prevents an increase of leak current can be designed by this constitution.

Third Embodiment

Figure 5:
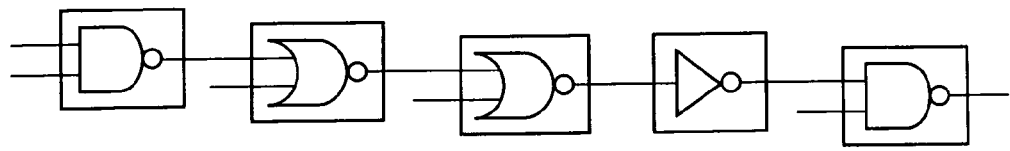
FIG. 5 is a circuit block diagram showing an arrangement of a logical circuit before the replacement with the low threshold value transistor in the designing method according to a third embodiment.
Figure 6:
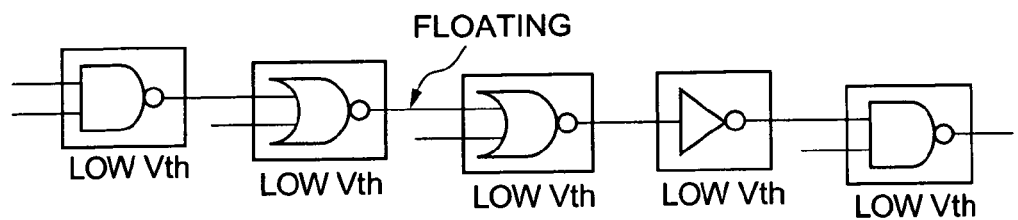
FIG. 6 is a circuit block diagram showing connection of the logical circuit after replacement with the low threshold value transistor and before re-replacement in the designing method according to the third embodiment.

Next, in a semiconductor integrated circuit according to a third embodiment, a constitution will be considered in which a plurality of transistors having different threshold values are used for high speed•low power consumption. First, the constitution is designed with transistors whose threshold values are high, and a critical path in connection of designed logical circuits is searched as shown in FIG. 5. By the above-described algorithm, this critical path is detected to be generated between second-stage and third-stage NOR circuits as shown in FIG. 6. Therefore, as shown in FIG. 7, after replacing the NOR circuit of the second stage which is the previous stage with a transistor whose threshold value is low, a path having a possibility that a leak current increases by combination of circuits is further searched.

In a case where there is a standard cell (multiple-input NAND circuit, NOR circuit, etc.) in which the certain number of or more transistors are connected in parallel in the critical path, the low threshold value transistor which has been once replaced is replaced with the high threshold value transistor again, an increase of leak current is prevented.

Fourth Embodiment

Figure 7:
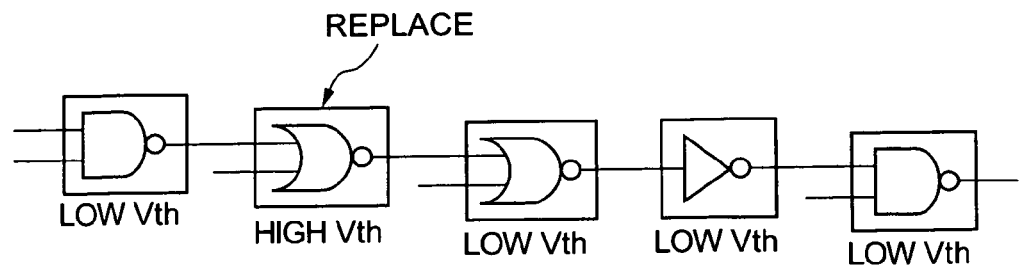
FIG. 7 is a circuit block diagram showing connection the logical circuit after re-replacement of the low threshold value transistor with the high threshold value transistor in the designing method according to third and fourth embodiments.

In a case where a standard cell (NAND logic) of a type in which PMOSs are arranged in parallel is connected to a subsequent stage of a standard cell (NOR logic) of a type in which NMOSs are arranged in parallel after replacing a critical path with a low threshold value transistor in a second embodiment, or a standard cell (NOR logic) of a type in which the NMOSs are arranged in parallel is connected to a subsequent stage of the standard cell (NAND logic) of the type in which the PMOSs are arranged in parallel, as shown in FIG. 7, either of two continuously connected transistors having the low threshold value is replaced with a high threshold value transistor. Accordingly, an increase of a leak current can be prevented.

Fifth Embodiment

Figure 8:
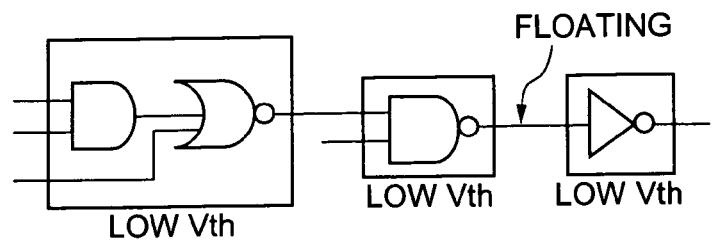
FIG. 8 is a circuit block diagram showing a floating state of a subsequent-stage logical circuit in a coexistence state of an NMOS juxtaposed portion and a PMOS juxtaposed portion in the designing method according to a fifth embodiment.
Figure 9:
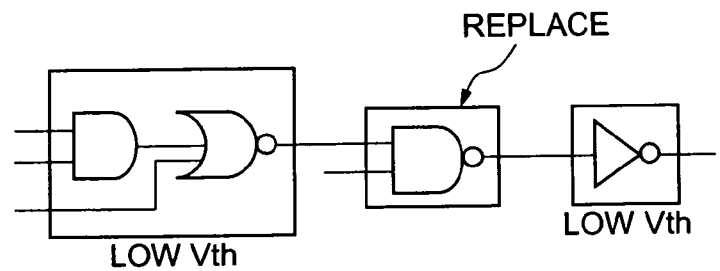
FIG. 9 is a circuit block diagram showing a replacing/returning state from the low threshold value transistor to the high threshold value transistor in the fifth embodiment.
Figure 18A:
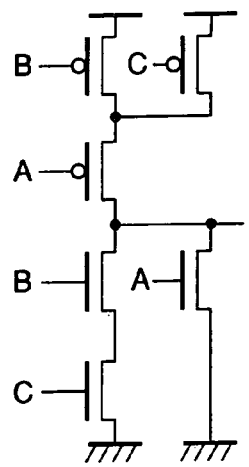
FIG. 18(a) is a transistor connection diagram in an AND-NOR circuit having three inputs.
Figure 18B:
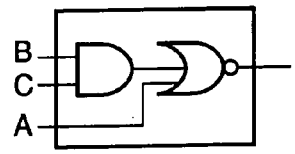
FIG. 18(b) is a circuit diagram of a standard cell.

In a case where there is a standard cell (FIG. 8) in which an juxtaposed NMOS portion coexists with a juxtaposed PMOS portion after replacing a critical path with a low threshold value transistor in the second embodiment, the standard cell is returned to a high threshold value transistor. Alternatively, a standard cell of a subsequent stage is surely returned to a high threshold value transistor, an increase of leak current is prevented (FIG. 9). A concrete constitution of the standard cell corresponds to a constitution of a conventional example described with reference to FIGS. 18 and 19.

Other Embodiments

It is to be noted that the present method or apparatus is not limited to the above-described embodiments, and can be variously modified. Although the above-described embodiments duplicated, as a basic constitution, for example, a circuit in which low threshold value PMOSs are juxtaposed is connected to a subsequent stage of a circuit in which low threshold value NMOSs are juxtaposed. Alternatively, a circuit in which low threshold value NMOSs are juxtaposed is connected to a subsequent stage of a circuit in which low threshold value PMOSs are juxtaposed. In this case, either circuit may be replaced with a high threshold value transistor for a purpose of preventing an increase of leak current of the transistor in a designing method.

Moreover, in designing a semiconductor integrated circuit in which a plurality of types of transistors having different threshold voltages are used, in a case where a portion connected to the low threshold value NMOS in parallel coexists with a portion connected to the low threshold value PMOS in parallel, the circuit itself or a circuit of the subsequent stage may be replaced with a high threshold value circuit for a purpose of preventing an increase of leak current of the transistor in the designing method.

Furthermore, the designing method may be constituted in such a manner that after analyzing potential differences from a power voltage and a ground voltage, attributable to a leak current of the transistor of each node of the circuit, and analyzing accompanying leak current, the transistor is replaced with a high threshold value transistor or a buffer is inserted for a purpose of preventing the leak current of the transistor.

Additionally, the designing method may be constituted for a purpose of preventing the leak current of the transistor using the above-described designing method after analyzing a timing of the circuit, and replacing the transistor with a low threshold value transistor for speeding-up.

Any embodiment has a constitution/function similar to that of the designing method of the semiconductor integrated circuit according to the first to fifth embodiments, and a similar effect can be obtained.

Sixth Embodiment

Figure 10:
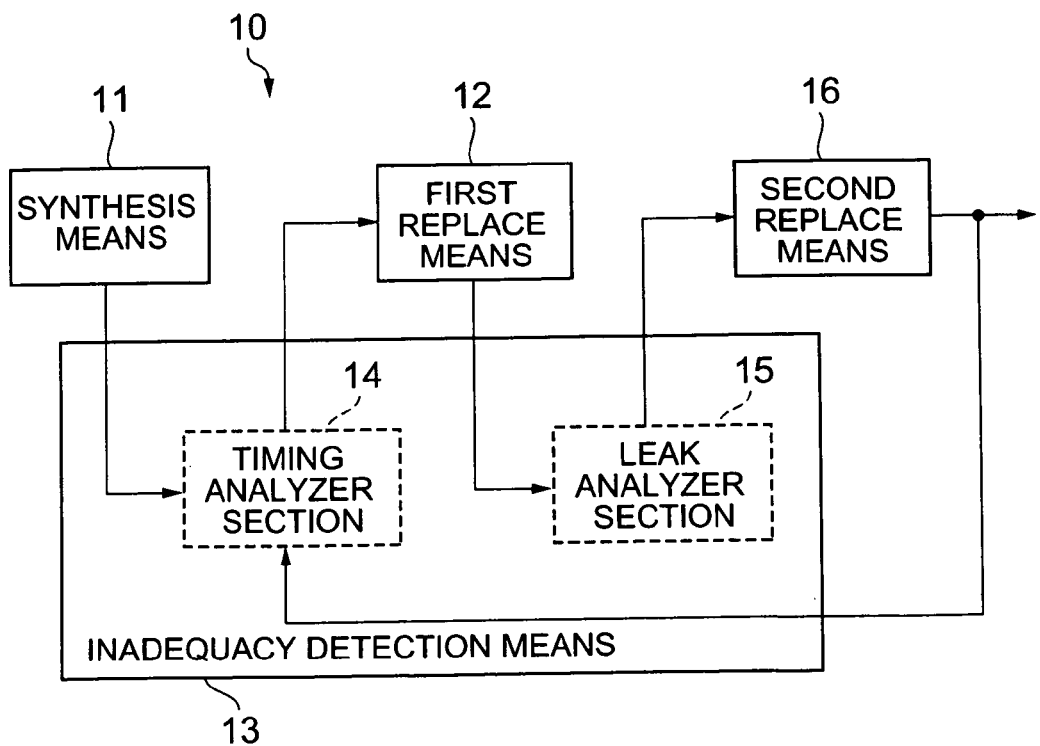
FIG. 10 is a block constitution diagram showing a constitution of a designing apparatus of a semiconductor integrated circuit according to a sixth embodiment.

It is to be noted that all the above-described embodiments relate to a method of designing a semiconductor integrated circuit, but this method is not limited to these embodiments, and the method can be realized also by a designing apparatus for a semiconductor integrated circuit according to a sixth embodiment for executing algorithms by the designing methods according to the first to fifth embodiments. FIG. 10 is a block constitution diagram showing a basic constitution of the designing apparatus according to the sixth embodiment. The designing apparatus designs a semiconductor integrated circuit in which high threshold value transistors and low threshold value transistors exist in a mixed manner and which performs a predetermined logical operation.

In FIG. 10, a designing apparatus 10 for a semiconductor integrated circuit comprises at least: synthesis means 11 for synthesizing the semiconductor integrated circuit by a predetermined circuit arrangement in which a plurality of logical circuits each performing the predetermined logical operation are continuously connected; first replacement means 12 for replacing the predetermined circuit arrangement in such a manner that a low-threshold-value high-speed transistor is applied to a portion required to be speeded up and a high-threshold-value low-speed transistor is applied to a portion which is not required to be speeded up in the predetermined circuit arrangement; inadequacy detection means 13 for detecting such an inadequacy of connection that a potential of a signal flowing through the circuit gradually deviates from a power voltage and a ground voltage, when the low-threshold-value high-speed transistors are continuously connected; and second replacement means 16 for replacing the low-threshold-value high-speed transistor disposed in a portion in which the inadequacy of the connection is detected with a high-threshold-value low-speed transistor.

In a concrete constitution, the inadequacy detection means 13 comprises: a timing analysis section 14 which analyzes an operation timing of a circuit arrangement synthesized by the synthesis means 11 and subjected to P&R and which outputs an analysis result to the first replacement means 12; and a leak analysis section 15 which analyzes a leak current in a circuit arrangement replaced by the first replacement means 12 for replacing the high-threshold-value low-speed transistor with the low-threshold-value high-speed transistor based on an output of the timing analysis section 14 and which outputs the analysis result to the second replacement means 16. In the circuit constitution rearranged in such a manner as to prevent the leak current output by the second replacement means 16 from being generated, the result is supplied to the timing analysis section 14 again, and a timing of the rearranged circuit constitution is analyzed. In a case where the timing of the rearranged circuit constitution, analyzed by the timing analysis section 14, does not reach a desired value, simulation is performed via the first replacement means 12 and leak analysis section 15 several times again. Finally, a circuit arrangement in which a best circuit arrangement is completed is output.

By the use of the inadequacy detection means 13 which is a basic constitution, and the timing analysis section 14 and leak analysis section 15 which are detailed constitutions, an effect similar to that of the designing method according to each of the first to fifth embodiments can be realized even by the designing apparatus 10 of the semiconductor integrated circuit according to the sixth embodiment.

Seventh Embodiment

Figure 11:
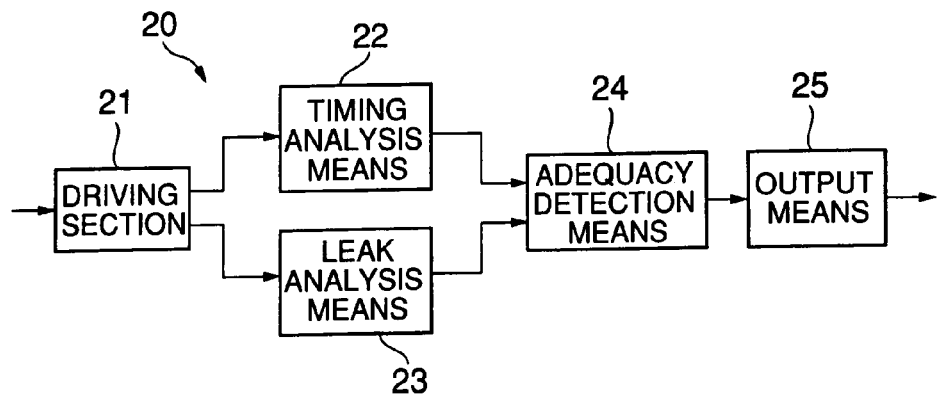
FIG. 11 is a block constitution diagram showing an inspection apparatus of the semiconductor integrated circuit according to a seventh embodiment.
Figure 12A:
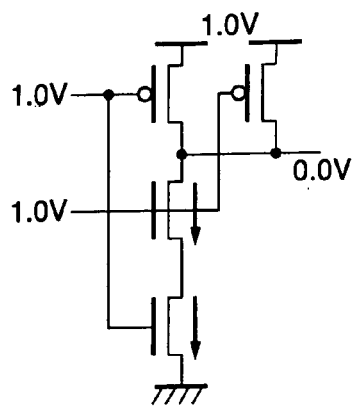
FIG. 12(a) shows an example of 1 V input voltage and output voltage in a case where the high threshold value transistor is used.
Figure 12B:
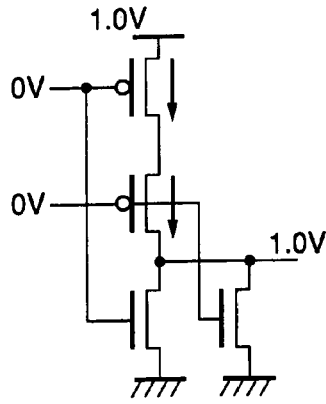
FIG. 12(b) is a circuit diagram showing an example of 0 V input voltage and output voltage.
Figure 13A:
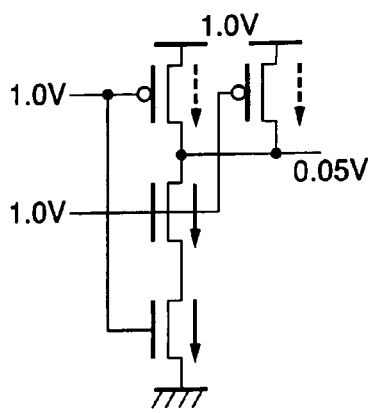
FIG. 13(a) shows an example of 1 V input voltage and output voltage in a case where the low threshold value transistor is used.
Figure 13B:
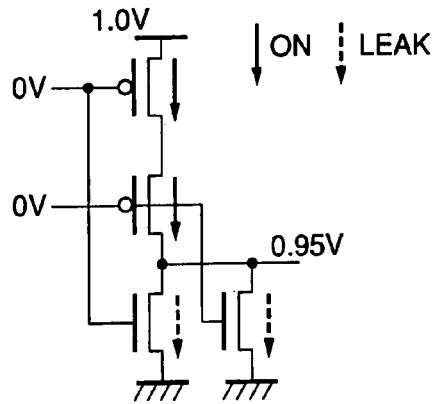
FIG. 13(b) is a circuit diagram showing an example of 0 V input voltage and output voltage.
Figure 16A:
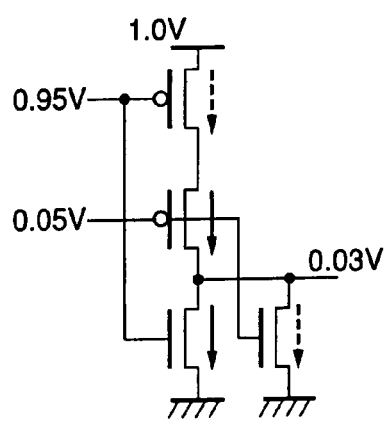
FIG. 16(a) is a circuit diagram showing an output voltage in a case where input voltages are 0.95 V and 0.05 V in a NOR circuit.
Figure 16B:
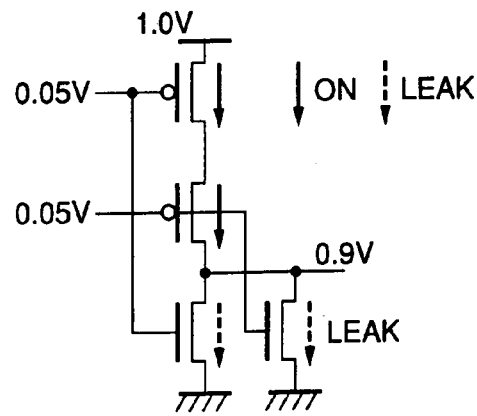
FIG. 16(b) is a circuit diagram showing an output voltage in a case where both input voltages are 0.05 V.
Figure 17:
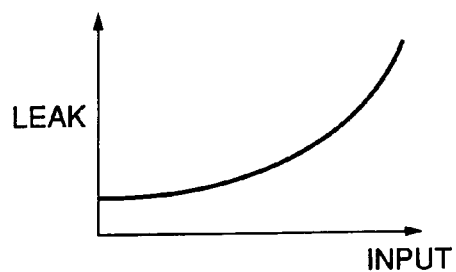
FIG. 17 is a characteristic diagram showing a relation between the input voltage and the leak current.

Furthermore, the present application is not limited to a designing method or apparatus for a semiconductor integrated circuit, and is also applicable to an inspection apparatus which inspects a circuit operation of an already completed semiconductor integrated circuit. An inspection apparatus for a semiconductor integrated circuit according to a seventh embodiment shown in FIG. 11 is applied to an inspection apparatus for inspecting a semiconductor integrated circuit having a predetermined circuit arrangement in which a plurality of logical circuits each performing a predetermined logical operation are continuously connected while high threshold value transistors are arranged/mixed with low threshold value transistors. In FIG. 11, an inspection apparatus 20 for the semiconductor integrated circuit comprises: a driving section 21 which sets a semiconductor integrated circuit completed with a predetermined circuit arrangement and which supplies a power voltage and an operation current; timing analysis means 22 for analyzing an operation timing of the semiconductor integrated circuit driven by the driving section 21; leak analysis means 23, driven by the driving section 21, for analyzing a leak current of a semiconductor device in the circuit arrangement; inadequacy detection means 24 for detecting, based on the operation timing analyzed by the timing analysis means 22 and the leak current analyzed by the leak analysis means 23, such an inadequacy of connection that a potential of a signal flowing through the circuit gradually deviates from a power voltage and a ground voltage, when low-threshold-value high-speed transistors are continuously connected; and output means 25 for specifying and outputting a portion in which the inadequacy of the connection is detected based on the detected inadequacy of the connection, and replacing the low-threshold-value high-speed transistor disposed in this portion with the high-threshold-value low-speed transistor to thereby re-design and output an optimum circuit arrangement.

The inspection apparatus 20 attaches a semiconductor package of a prototype model or a package already formed into a product, supplies the power voltage from the driving section 21 to supply the operation current, and accordingly actually drives the package. The apparatus analyzes the operation timing by the timing analysis means 22, and analyzes the leak current by the leak analysis means 23 to thereby detect the inadequacy of the semiconductor integrated circuit by the inadequacy detection means 24.

Therefore, in the seventh embodiment, different from the inspection apparatus of the semiconductor integrated circuit according to the sixth embodiment shown in FIG. 10, an integrated circuit already half-completed or completed as the integrated circuit with a predetermined circuit arrangement is inspected without repeating a detection operation in which the output of the second replacement means 16 is returned to the timing analysis section 14 of the inadequacy detection means 13 to thereby analyze the leak current by the leak analysis section 15. As described above, the present technique can be realized as the method of designing the semiconductor integrated circuit, the designing apparatus, and further the inspection apparatus.

In any category, the inadequacy of the circuit operation which is an application object of the present technique can be securely detected by analyzing the operation timing and/or the leak current. The present technique largely contributes to the providing of the semiconductor integrated circuit which stably operates.

As described above, in the portion in which the deviation of the potential of the operation signal inside the circuit from the power voltage and ground voltage is caused by the application of the low-threshold-value high-speed transistor to the semiconductor integrated circuit by the demand for the speeding-up, the low-threshold-value high-speed transistor is replaced with the constitution having less leak current again. Accordingly, while the whole power consumption of the semiconductor IC is suppressed to be low, a circuit which is stable at a high speed can be designed.

What is claimed is:

1. A method of designing a semiconductor integrated circuit which performs a predetermined logical operation, the method comprising:

synthesizing the semiconductor integrated circuit by a predetermined circuit arrangement in which a plurality of logical circuits each performing the predetermined logical operation are continuously connected;

replacing the predetermined circuit arrangement in such a manner that a low-threshold-value high-speed transistor is applied to a portion required to be speeded up, and a high-threshold-value low-speed transistor is applied to a portion which is not required to be speeded up in the predetermined circuit arrangement;

continuously connecting the low-threshold-value high-speed transistors to thereby detect such an inadequacy of connection that a potential of a signal propagating through stages of the circuit gradually deviates from a power voltage and a ground voltage; and replacing the low-threshold-value high-speed transistor disposed in a portion in which the inadequacy of the connection is detected with a constitution having less leak current.

2. The method of designing the semiconductor integrated circuit according to claim 1, wherein detecting the inadequacy of the connection comprises: replacing a portion of the circuit arrangement in which a certain number of or more NMOS and/or PMOS transistors are juxtaposed with the high-threshold-value low-speed transistor; and/or connecting a circuit arrangement having a small juxtaposition number to a subsequent stage of the portion of the circuit arrangement.

3. The method of designing the semiconductor integrated circuit according to claim 2, wherein detecting the inadequacy of the connection comprises the steps of: replacing a portion of the circuit arrangement in which three or more NMOS and/or PMOS transistors are juxtaposed with the high-threshold-value low-speed transistors.

4. The method of designing the semiconductor integrated circuit according to claim 2, wherein detecting the inadequacy of the connection comprises: connecting a circuit arrangement having a small juxtaposition number to a subsequent stage of a portion of the circuit arrangement in which three or more NMOS and/or PMOS transistors are juxtaposed.

5. The method of designing the semiconductor integrated circuit according to claim 1, wherein detecting the inadequacy of the connection comprises: replacing any circuit with a high threshold value transistor in a case where a circuit in which low threshold value PMOSs are juxtaposed is connected to a subsequent stage of a circuit in which low threshold value NMOSs are connected in parallel.

6. The method of designing the semiconductor integrated circuit according to claim 1, wherein detecting the inadequacy of the connection comprises: replacing any circuit with a high threshold value transistor in a case where a circuit in which low threshold value NMOSs are connected juxtaposition to a subsequent stage of a circuit in which low threshold value PMOSs are connected in parallel.

7. The method of designing the semiconductor integrated circuit according to claim 1, wherein detecting the inadequacy of the connection comprises: replacing a juxtaposed portion coexistence circuit with the high-threshold-value low-speed transistor in a case where there is the juxtaposed portion coexistence circuit in which a portion connected to the low threshold value NMOS in parallel coexists with a portion connected to the low threshold value PMOS in parallel.

8. The method of designing the semiconductor integrated circuit according to claim 1, wherein detecting the inadequacy of the connection comprises: replacing a circuit of a subsequent stage of a juxtaposed portion coexistence circuit with the high-threshold-value low-speed transistor in a case where there is the juxtaposed portion coexistence circuit in which a portion connected to the low threshold value NMOS in parallel coexists with a portion connected to the low threshold value PMOS in parallel.

9. An apparatus for designing a semiconductor integrated circuit in which high threshold value transistors are arranged/mixed with low threshold value transistors and which performs a predetermined logical operation, the apparatus comprising:
synthesis unit configured to synthesize the semiconductor integrated circuit by a predetermined circuit arrangement in which a plurality of logical circuits each performing the predetermined logical operation are continuously connected;
first replacement unit configured to replace the predetermined circuit arrangement in such a manner that a low-threshold-value high-speed transistor is applied to a portion required to be speeded up and a high-threshold-value low-speed transistor is applied to a portion which is not required to be speeded up in the predetermined circuit arrangement;
inadequacy detection unit configured to detect such an inadequacy of connection that a potential of a signal propagating through stages of the circuit gradually deviates from a power voltage and a ground voltage, when the low-threshold-value high-speed transistors are continuously connected; and
second replacement unit configured to replace the low-threshold-value high-speed transistor disposed in a portion in which the inadequacy of the connection is detected with the high-threshold-value low-speed transistor.

10. The apparatus for designing the semiconductor integrated circuit according to claim 9, further comprising: timing analysis unit configured to analyze an operation timing of the semiconductor integrated circuit synthesized before replacing the predetermined circuit arrangement in such a manner as to apply the high-threshold-value low-speed transistor after synthesizing the semiconductor integrated circuit; and leak analysis unit configured to analyze a leak current of a semiconductor arrangement replaced after the replacement with the low-threshold-value high-speed transistor, wherein the inadequacy of the connection is detected by the inadequacy detection unit, the portion in which the inadequacy is detected is replaced with the high-threshold-value low-speed transistor again by the second replacement unit, the operation timing is analyzed from the semiconductor integrated circuit replaced again by the timing analysis unit again, and an operation including the timing analysis to the re-replacement is repeated required times to thereby determine an optimum circuit arrangement.

11. The apparatus for designing the semiconductor integrated circuit according to claim 10, wherein a portion of the circuit arrangement in which a certain number of or more NMOS and/or PMOS transistors are juxtaposed is replaced with the high-threshold-value low-speed transistor, and/or a circuit arrangement having a small juxtaposition number is connected to a subsequent stage of the portion of the circuit arrangement, when the inadequacy of the connection is detected.

12. The apparatus for designing the semiconductor integrated circuit according to claim 11, wherein a portion of the circuit arrangement in which three or more NMOS and/or PMOS transistors are juxtaposed is replaced with the high-threshold-value low-speed transistors, when the inadequacy of the connection is detected.

13. The apparatus for designing the semiconductor integrated circuit according to claim 11, wherein a circuit arrangement having a small juxtaposition number is connected to a subsequent stage of a portion of the circuit arrangement in which three or more NMOS and/or PMOS transistors are juxtaposed, when the inadequacy of the connection is detected.

14. The apparatus for designing the semiconductor integrated circuit according to claim 10, wherein any circuit is replaced with a high threshold value transistor, when the inadequacy of the connection is detected in a case where a circuit in which low threshold value PMOSs are juxtaposed is connected to a subsequent stage of a circuit in which low threshold value NMOSs are connected in parallel.

15. The apparatus for designing the semiconductor integrated circuit according to claim 10, wherein any circuit is replaced with a high threshold value transistor, when the inadequacy of the connection is detected in a case where a circuit in which low threshold value NMOSs are connected juxtaposition to a subsequent stage of a circuit in which low threshold value PMOSs are connected in parallel.

16. The apparatus for designing the semiconductor integrated circuit according to claim 10, wherein a juxtaposed portion coexistence circuit is replaced with the high-threshold-value low-speed transistor, when the inadequacy of the connection is detected in a case where there is the juxtaposed portion coexistence circuit in which a portion connected to the low threshold value NMOS in parallel coexists with a portion connected to the low threshold value PMOS in parallel.

17. The apparatus for designing the semiconductor integrated circuit according to claim 10, wherein a circuit of a subsequent stage of a juxtaposed portion coexistence circuit is replaced with the high-threshold-value low-speed transistor, when the inadequacy of the connection is detected in a case where there is the juxtaposed portion coexistence circuit in which a portion connected to the low threshold value NMOS in parallel coexists with a portion connected to the low threshold value PMOS in parallel.

* * * * *